(12) United States Patent
Tanji et al.

(10) Patent No.: US 11,729,106 B2
(45) Date of Patent: Aug. 15, 2023

(54) SERVICE QUALITY CONTROL DEVICE, METHOD, AND PROGRAM

(71) Applicant: Nippon Telegraph and Telephone Corporation, Tokyo (JP)

(72) Inventors: Naoyuki Tanji, Musashino (JP); Atsushi Takada, Musashino (JP); Kyoko Yamagoe, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/623,747

(22) PCT Filed: Jul. 3, 2019

(86) PCT No.: PCT/JP2019/026431
§ 371 (c)(1),
(2) Date: Dec. 29, 2021

(87) PCT Pub. No.: WO2021/001958
PCT Pub. Date: Jan. 7, 2021

(65) Prior Publication Data
US 2022/0255869 A1 Aug. 11, 2022

(51) Int. Cl.
*G06F 15/173* (2006.01)
*H04L 47/2475* (2022.01)
(Continued)

(52) U.S. Cl.
CPC ........ *H04L 47/2475* (2013.01); *H04L 41/083* (2013.01); *H04L 43/0888* (2013.01)

(58) Field of Classification Search
CPC ............... H04L 47/2475; H04L 41/083; H04L 43/0888; H04L 41/0806; H04L 41/0896;
(Continued)

(56) References Cited

U.S. PATENT DOCUMENTS 10,524,145 B1 * 12/2019 Das .................. H04W 24/08
2013/0065562 A1 * 3/2013 Singh ................ H04L 41/0896
455/414.1
(Continued)

FOREIGN PATENT DOCUMENTS

JP 2007006203 1/2007

OTHER PUBLICATIONS

Bradner et al., "Benchmarking Methodology for Network Interconnect Devices," Network Working Group Request for Comments: 2544, Mar. 1999, retrieved from URL <https://tools.ietf.org/html/rfc2544>, 31 pages.

*Primary Examiner* — Karen C Tang
(74) *Attorney, Agent, or Firm* — Fish & Richardson P.C.

(57) ABSTRACT

A service quality control device includes: an APL profile 20 that records the profile of an application; an APL determination unit 10 that acquires network performance including throughput and network information including quality of user's experience from a network device constituting the network 1 and determines the application to be used by a user by comparing the acquired network information with the APL profile 20; a causal model generation unit 30 that acquires network setting information including a bandwidth throttling value from the network device, generates a causal model that associates network setting information with network performance for each application, and generates a causal model that associates network performance with quality of user's experience for each application; and an optimization unit 50 that finds a network setting that maximizes the network performance and the quality of user's experience of a plurality of applications on the basis of the causal model.

5 Claims, 11 Drawing Sheets

(51) Int. Cl.
*H04L 41/083* (2022.01)
*H04L 43/0888* (2022.01)
*G06F 15/16* (2006.01)

(58) Field of Classification Search
CPC ............ H04L 41/5009; H04L 41/5067; H04L 43/0829; H04L 43/0852; H04L 43/087; H04L 65/80; H04L 67/51; H04L 67/61; H04L 47/80
USPC .......................................................... 709/224
See application file for complete search history.

(56) References Cited

U.S. PATENT DOCUMENTS

| | | | | |
|---|---|---|---|---|
| 2014/0140213 | A1* | 5/2014 | Raleigh | H04L 41/0893 370/235 |
| 2015/0098393 | A1* | 4/2015 | Tofighbakhsh | H04W 4/50 370/329 |
| 2017/0279921 | A1* | 9/2017 | Foulkes | G06F 9/5038 |
| 2018/0359658 | A1* | 12/2018 | Chitrapu | H04L 41/5067 |
| 2020/0015121 | A1* | 1/2020 | Misra | H04W 24/08 |
| 2020/0162353 | A1* | 5/2020 | Szigeti | H04L 41/5009 |
| 2020/0275304 | A1* | 8/2020 | Zhao | H04L 47/2475 |
| 2020/0314503 | A1* | 10/2020 | Wang | H04L 65/762 |
| 2022/0244993 | A1* | 8/2022 | MacDonald | G06F 11/3447 |
| 2022/0255816 | A1* | 8/2022 | Eriksson | H04L 43/10 |

\* cited by examiner

Fig. 2

| DETERMINATION RULE | APPLICATION |
|---|---|
| •TCP<br>•PORT NUMBER 80 | WEB BROWSING |
| •TCP<br>•PORT NUMBER 22<br>•AVERAGE TRAFFIC VOLUME > 1 Mbps | WEB BROWSING |
| •UDP<br>•PORT NUMBERS 3478 TO 3481 | VOICE AND VIDEO CALLS |
| CLASSIFICATION MODEL (DECISION TREE AND SVM OR THE LIKE) | OUTPUT RESULTS OF CLASSIFICATION MODEL |

Fig. 3

| TARGET TRAFFIC INFORMATION | DATA TYPE | TIME-SERIES DATA |
|---|---|---|
| PROTOCOL = TCP DESTINATION PORT = 54321 SOURCE PORT = 80 | FLOW DATA | TRAFFIC VOLUME |
| | QoS MEASUREMENT DATA | DELAY, JITTER, PACKET LOSS |
| | QoE MEASUREMENT DATA | R VALUE |
| PROTOCOL = TCP DESTINATION PORT = 22 SOURCE PORT = 12345 | FLOW DATA | TRAFFIC VOLUME |
| | QoS MEASUREMENT DATA | DELAY, JITTER, PACKET LOSS |

Fig. 4

| TARGET TRAFFIC INFORMATION | DATA TYPE | TIME-SERIES DATA | APL DETERMINATION RESULT |
|---|---|---|---|
| PROTOCOL = TCP DESTINATION PORT = 54321 SOURCE PORT = 80 | FLOW DATA | TRAFFIC VOLUME | WEB BROWSING |
| | QoS MEASUREMENT DATA | DELAY, JITTER, PACKET LOSS | |
| | QoE MEASUREMENT DATA | R VALUE | |
| PROTOCOL = TCP DESTINATION PORT = 22 SOURCE PORT = 12345 | FLOW DATA | TRAFFIC VOLUME | FILE TRANSFER |
| | QoS MEASUREMENT DATA | DELAY, JITTER, PACKET LOSS | |

Fig. 5

| ITEM | VALUE |
|---|---|
| MAXIMUM BANDWIDTH | DEVICE A_IF1: 1,000 Mbps |
| | DEVICE B_IF: 10 Gbps |
| | ⋮ |
| BANDWIDTH THROTTLING | TCP80:10Mbps |
| | TCP22:1Mbps |
| | ⋮ |
| QUEUE LENGTH | QUEUE 1(TCP80): 1000 |
| | QUEUE 2(UDP3478): 1000 |
| | ⋮ |
| NUMBER OF ACCOMMODATED USERS | DEVICE A: 980 |
| | DEVICE B: 1,234 |
| | ⋮ |

Fig. 8

| APL($\alpha$) | APL($\beta$) | APL($\gamma$) | $\Sigma$ QoE |
|---|---|---|---|
| 1 | 1 | 8 | 9.30 |
| 1 | 2 | 7 | 9.33 |
| 1 | 3 | 6 | 9.35 |
| 1 | 4 | 5 | 9.38 |
| 1 | 5 | 4 | 9.40 |
| 1 | 6 | 3 | 9.43 |
| 1 | 7 | 2 | 9.45 |
| 1 | 8 | 1 | 9.48 |
| ⋮ | ⋮ | ⋮ | — |
| ⋮ | ⋮ | ⋮ | — |
| 6 | 2 | 1 | 6.98 |
| 7 | 1 | 2 | 6.45 |
| 7 | 2 | 1 | 6.48 |
| 8 | 1 | 1 | 5.98 |

SERVICE QUALITY CONTROL DEVICE, METHOD, AND PROGRAM

CROSS-REFERENCE TO RELATED APPLICATIONS

This application is a National Stage application under 35 U.S.C. § 371 of International Application No. PCT/JP2019/026431, having an International Filing Date of Jul. 3, 2019, the disclosure of which is considered part of the disclosure of this application, and is incorporated in its entirety into this application.

TECHNICAL FIELD

The present invention relates to a service quality control device, a service quality control method, and a program.

BACKGROUND ART

Conventionally, control of network performance such as bandwidth throttling of a network has been performed for a specific service and a specific protocol of a network layer or an application layer. However, users rarely use only specific services and specific protocols. It is considered that users often use a plurality of applications such as online games, P2P calls, and browsing in parallel.

Therefore, network performance control (QoS control) performed for a specific application may have little effect on improving the quality of user's experience (hereinafter sometimes referred to as QoE) of services provided by other applications. Alternatively, network performance control for a specific application may deteriorate the quality of services provided by other applications.

For example, because delay loss increases in services such as video distribution, network performance (hereinafter sometimes referred to as QoS) is improved by increasing bandwidth allocation, but the application stores video data in a buffer and there is no effect on improving the quality of user's experience. In addition, when the bandwidth allocation is increased for the purpose of improving the quality of user's experience of a specific application, other applications severe to delay are greatly affected, which may result in deterioration of QoE.

Therefore, for example, PTL 1 discloses a method of estimating the quality of user's experience from the status of control packets and communication between terminals that execute applications. Further, NPL 1 discloses a method of measuring network performance by flowing traffic having a variable packet length.

CITATION LIST

Patent Literature

[PTL 1] Japanese Patent Application Publication No. 2007-6203

Non Patent Literature

[NPL 1] RFC2544 Benchmarking methodology for Network Interconnect Devices, [retrieved on Jun. 25, 2019], Internet (URL: https://tools.ietf.org/html/rfc2544)

SUMMARY OF THE INVENTION

Technical Problem

However, even if the deterioration factor is identified using the above-mentioned conventional technique and QoS control is performed to improve the QoE of one application, the QoE of the other application may deteriorate significantly, and the quality of user's experience of the service provided by the application as a whole may decrease. That is, there is a problem that the conventional network performance control is limited to individual control and cannot be optimally controlled as a whole.

With the foregoing in view, an object of the present invention is to provide a service quality control device, a service quality control method, and a program for controlling network performance so as to maximize the service quality provided by a plurality of applications.

Means for Solving the Problem

A service quality control device according to an aspect of the present invention is a service quality control device including: an APL profile that records the profile of an application; an APL determination unit that acquires a port number, a traffic volume, network performance including throughput, and network information including quality of user's experience from a network device constituting the network and determines the application to be used by a user by comparing the acquired network information with the APL profile; a causal model generation unit that acquires network setting information including a bandwidth throttling value from the network device, generates a causal model that associates network setting information with network performance for each application, and generates a causal model that associates network performance with quality of user's experience for each application; and an optimization unit that finds a network setting that maximizes the network performance and the quality of user's experience of a plurality of applications on the basis of the causal model.

A service quality control method according to an aspect of the present invention is a service quality control method performed by a service quality control device, including: an APL determination step of acquiring a port number, a traffic volume, network performance including throughput, and network information including quality of user's experience from a network device constituting a network and determining the application to be used by a user by comparing the acquired network information with an APL profile that records the profile of an application; a causal model generation step of acquiring network setting information including a bandwidth throttling value from the network device, generating a causal model that associates network setting information with network performance for each application, and generating a causal model that associates network performance with quality of user's experience for each application; and an optimization step of finding a network setting that maximizes the network performance and the quality of user's experience of a plurality of applications on the basis of the causal model.

A program according to one aspect of the present invention is a program for causing a computer to function as the service quality control device.

Effects of the Invention

According to the present invention, it is possible to control network performance so as to maximize the service quality provided by a plurality of applications.

BRIEF DESCRIPTION OF DRAWINGS

FIG. 2 is a diagram illustrating an example of an APL profile illustrated in FIG. 1.

FIG. 3 is a diagram illustrating an example of network information acquired by an APL determination unit illustrated in FIG. 1.

FIG. 4 is a diagram illustrating an example of information output by the APL determination unit illustrated in FIG. 1.

FIG. 5 is a diagram illustrating an example of network setting information acquired by a causal model generation unit illustrated in FIG. 1.

FIG. 8 is a diagram schematically illustrating a process of finding a network setting that maximizes network performance and quality of user's experience performed by an optimization unit illustrated in FIG. 1.

DESCRIPTION OF EMBODIMENTS

Figure 1:
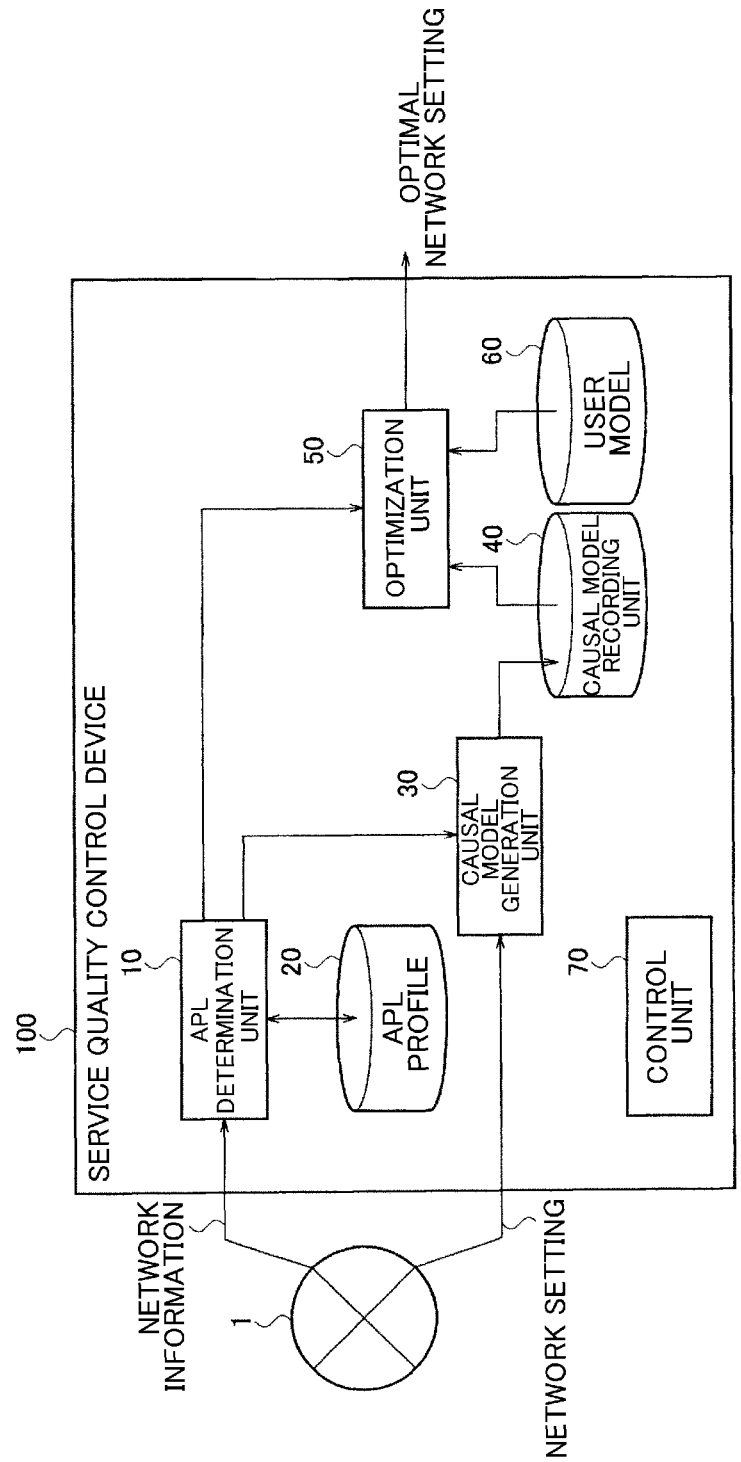
FIG. 1 is a diagram illustrating a functional configuration example of a service quality control device according to a first embodiment of the present invention.

Hereinafter, embodiments of the present invention will be described with reference to the drawings. The same components in a plurality of drawings are denoted by the same reference numerals and the redundant description thereof will not be provided.

First Embodiment

FIG. 1 is a diagram illustrating a functional configuration example of a service quality control device according to a first embodiment of the present invention. A service quality control device 100 illustrated in FIG. 1 is a device that optimizes network performance and quality of user's experience when a user uses a plurality of applications.

The service quality control device 100 includes an APL determination unit 10, an APL profile 20, a causal model generation unit 30, a causal model recording unit 40, an optimization unit 50, a user model 60, and a control unit 70. The service quality control device 100 can be realized by, for example, a computer including a ROM, a RAM, a CPU, and the like.

As illustrated in FIG. 1, the service quality control device 100 is connected to a network 1. The network 1 includes network devices such as routers and switches and application terminals that provide services. The notations of routers, switches, application terminals, and the like are omitted.

The APL profile 20 records the profile of an application. Here, the profile is a collection of information on the application, including data, protocols, setting values, and the like.

FIG. 2 illustrates an example of the record of the APL profile 20. The left column of FIG. 2 illustrates information on the application, and the right column illustrates the application corresponding to the information. Hereinafter, the columns of the table illustrated in the drawing will be referred to as the first columns from the left side.

As illustrated in FIG. 2, for example, in the case of a Web browsing application, the protocol is TCP (Transmission Control Protocol) and the port number is 80. In the case of a file transfer application, for example, the port number is 22, and the average traffic volume is 1 Mbps or more. In the case of a voice call application, the protocol is UDP (User Datagram Protocol) and the port number is 3478 to 3481. In this way, the profile is different for each application.

The APL determination unit 10 acquires a port number, a traffic volume, network performance including the throughput, and network information including the quality of user's experience from a network device constituting the network 1, and determines the application used by the user by comparing the acquired network information with the application profiles recorded in the APL profile 20.

FIG. 3 is a diagram illustrating an example of the acquired network information. The first column of FIG. 3 is the target traffic information, the second column is the data type, and the third column is the content of the time series data. The QoS measurement data is the value of throughput, delay, jitter, packet loss, and the like, which is periodically measured by a measuring instrument (not illustrated) provided in the network 1 by the method disclosed in NPL 1. The APL determination unit 10 acquires QoS measurement data such as throughput from the measuring instrument. Similarly, for the QoE measurement data, a measuring instrument (not illustrated) provided in the network 1 periodically calculates an R value, and the APL determination unit 10 acquires the R value. The R value is also called overall voice transmission quality and is a value of 50 (bad) to 90 (excellent) calculated from the QoS measurement data.

The network information illustrated in FIG. 3 may be acquired from the network 1 mainly by the service quality control device 100. That is, the service quality control device 100 may include a functional component that acts as the above-mentioned measuring instrument.

FIG. 4 is a diagram illustrating an example of information output by the APL determination unit 10. The information output by the APL determination unit 10 is information in which the network information (FIG. 3) acquired from the network 1 is associated with the application (fourth column).

The causal model generation unit 30 acquires network setting information such as bandwidth control and priority transfer from the network devices constituting the network 1, and generates a causal model that associates the network setting information with the network performance for each application. In addition, the causal model generation unit 30 generates a causal model that associates network performance with quality of user's experience for each application.

FIG. 5 is a diagram illustrating an example of network setting information. The first column of FIG. 5 is the item of network setting information such as the maximum bandwidth, the bandwidth throttling, the queue length, and the number of accommodated users, and the second column is the value of each item.

Figure 6:
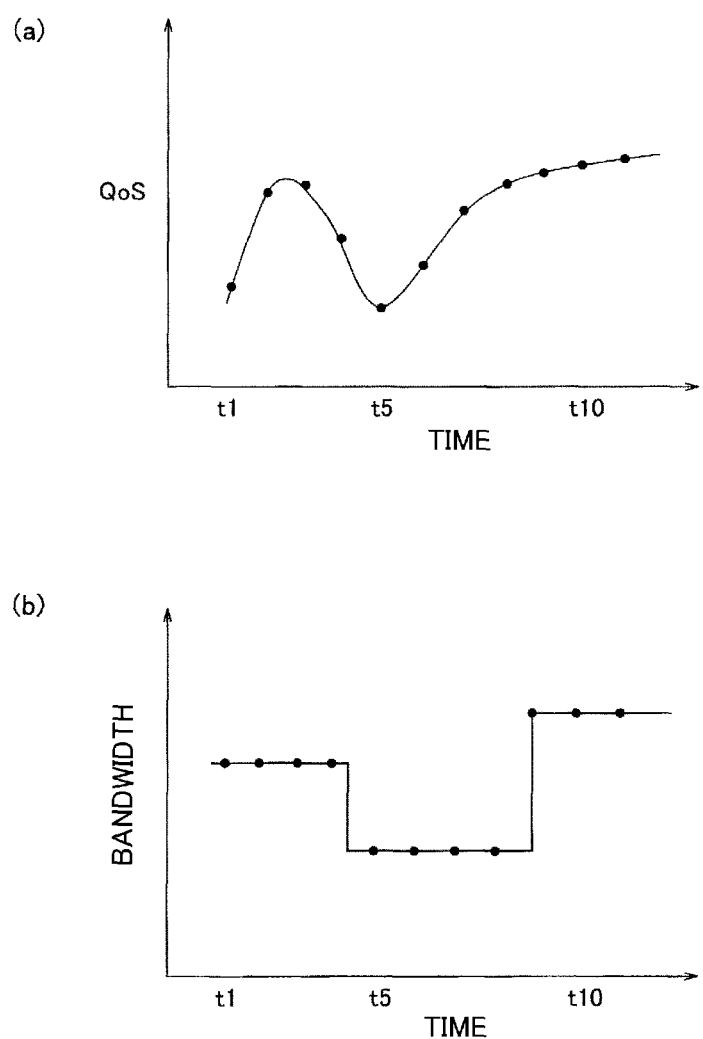
FIG. 6 is a diagram schematically illustrating an example of change in a QoS value and a bandwidth throttling with respect to time.

FIG. 6 is a diagram schematically illustrating an example of change over time in a QoS value and bandwidth throttling, which are values representing the network performance. FIG. 6(*a*) illustrates an example of the change over time in the QoS value. FIG. 6(*b*) illustrates an example of the change over time in the bandwidth throttling.

The causal model generation unit 30 plots the set of the bandwidth throttling and the QoS value at the same time illustrated in FIG. 6 on the xy coordinates, and generates a causal model that associating the bandwidth throttling with the QoS value. Similarly, the causal model generation unit 30 associates the QoS value with the QoE value indicating the degree of quality of user's experience. Further, the causal model generation unit 30 similarly associates, for example, the average number of accommodated users of the device through which traffic passes with the QoS value.

Figure 7:
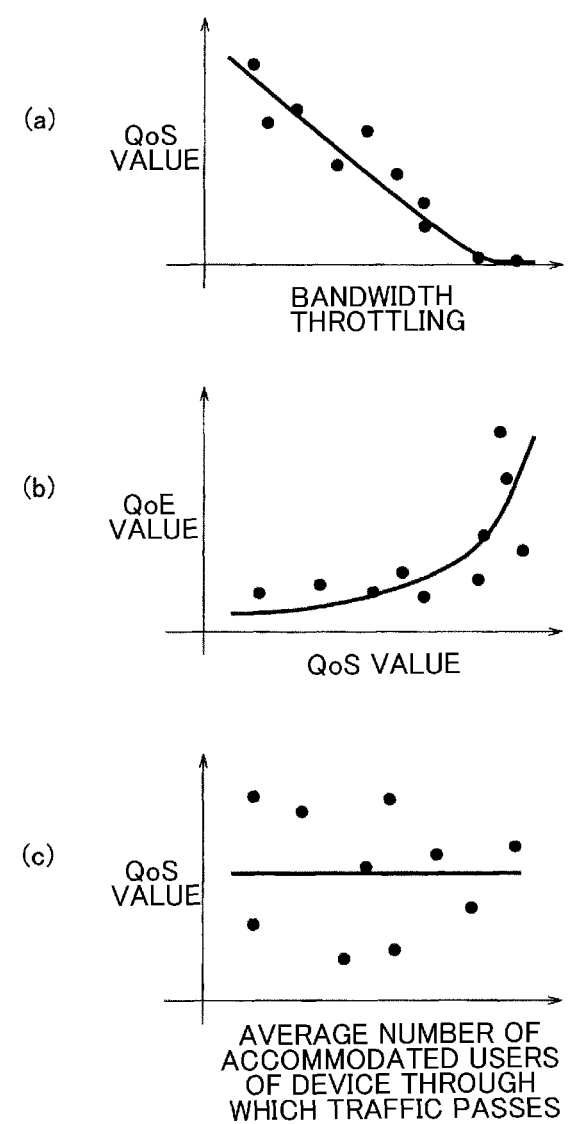
FIG. 7 is a diagram schematically illustrating an example of the relationship between the acquired network settings and the QoS value, and the relationship between the QoS value and the QoE value.

FIG. 7 is a diagram schematically illustrating a causal model for associating network setting information with network performance and network performance with quality of user's experience. FIG. 7(*a*) illustrates a causal model that associates the bandwidth throttling, which is one of the network setting information, with the QoS value. FIG. 7(*b*) illustrates a causal model that associates QoS values with QoE. FIG. 7(*c*) illustrates a causal model that associates the average number of accommodated users, which is one of pieces of the network setting information, with the QoS value.

The causal model illustrated in FIG. 7 can be obtained by general regression methods such as random forest regression, Ridge/Lasso regression, and deep learning. As illustrated in the following formulas, the causal model associates network setting information (for example, bandwidth throttling) with network performance (QoS value) and network performance (QoS value) with quality of user's experience (QoE value).

[Math. 1]

$$QoS\ value = f(bandwidth\ throttling) \quad (1)$$

$$QoE\ value = g(QoS\ value) \quad (2)$$

$$QoS\ value = h(average\ number\ of\ accommodated\ users) \quad (3)$$

Here, each of f, g, and h is a causal model. The causal models f, g, and h are stored in the causal model recording unit 40 in association with the corresponding application and network setting information. The "average number of accommodated users" in Formula (3) is an abbreviation for the average number of accommodated users of devices through which traffic passes.

The optimization unit 50 finds a network setting that maximizes the network performance and the quality of user's experience of a plurality of applications on the basis of the causal model and the user model 60. The user model 60 is, for example, the order of applications prioritized by the user.

The user model 60, for example, information representing the user characteristics that an application (α) (APL(α)) is prioritized and other applications (β) (γ) (APL(β) and APL(γ)) are not prioritized. In the user model 60, for example, the priority of the application of the user A can be expressed as APL(α)>APL(β)=APL(γ).

The optimization unit 50 finds a network setting that maximizes network performance by multiplying the QoS value of each application by a coefficient so that the priorities of applications have the above relationship, for example. The user model 60 may be omitted. The network setting may be found on the basis of only the causal model stored in the causal model recording unit 40.

The causal model recording unit 40 is not essential. For example, if the processing speed of the computer constituting the service quality control device 100 is sufficiently high, a network setting that maximizes the network performance each time the causal model is generated may be found in correspondence with the generated causal model.

The network setting that maximizes the network performance (QoS) and the quality of user's experience (QoE) of a plurality of applications is found, for example, by a full search. The full search is, for example, to obtain the total network performance and the total quality of user's experience in correspondence with each combination of pieces of network setting information of a plurality of applications.

FIG. 8 is a diagram illustrating an example in which the total network performance and the total quality of user's experience are obtained in the full search. Up to the third column in FIG. 8, the value of the bandwidth throttling when the maximum bandwidth is 10 Mbps is illustrated. The bandwidth throttling values of applications APL(α), APL(β), and APL(γ) include thirty five combinations of 1 Mbps, 1 Mbps, and 8 Mbps (118, second row) to 8 Mbps, 1 Mbps, and 1 Mbps (811, fifteenth row) illustrated in the second and subsequent rows of FIG. 8.

For example, the optimization unit 50 substitutes the bandwidth throttling value of each row illustrated in FIG. 8 into the causal model (Formula (1)) in which the bandwidth throttling values of APL(α), APL(β), and APL(γ) and the QoS value are associated and totals the QoS values obtained by the causal model.

Further, the optimization unit 50 substitutes the QoS values obtained by the causal model into the causal model (Formula (2)) in which the QoS value and the QoE value are associated and totals the obtained QoE values. The total QoE value is illustrated in the fourth column.

The combination of bandwidths that maximizes the total QoE values (ΣQoE) is maximized to 9.48 when the bandwidth throttling values of APL(α), APL(β), and APL(γ) are 1 Mbps, 8 Mbps, and 1 Mbps (ninth row), respectively. The combination of the network setting information that maximizes the total network performance and the combination of the network setting information that maximizes the total quality of user's experience do not always match.

As described above, the service quality control device 100 according to the present embodiment is a service quality control device connected to the network 1, including: the APL profile 20 that records the profile of an application; the APL determination unit 10 that acquires a port number, a traffic volume, network performance including throughput, and network information including quality of user's experience from a network device constituting the network 1 and determines an application used by a user by comparing the acquired network information with the APL profile 20; the causal model generation unit 30 that acquires the network setting information from the network device, generates a causal model that associates network setting information with network performance for each application, and generates a causal model that associates network performance with quality of user's experience for each application; and the optimization unit 50 that finds a network setting that maximizes the network performance and the quality of user's experience of a plurality of applications on the basis of the causal model. According to this configuration, the service quality control device 100 can control the performance of the network 1 so as to maximize the service quality provided by the plurality of applications. That is, the service quality control device 100 can control the network performance so as to maximize the service quality provided by the plurality of applications.

The control unit 70 controls the time-series operation of each functional configuration unit and causes the service quality control device 100 to operate as described above by cooperation of the functional configuration units. The control unit 70 may operate the service quality control device 100 on an hourly, daily, or day-of-week basis. Moreover, the control unit 70 may record the network settings obtained in this way. By doing so, it is possible to find a network setting that maximizes the network performance and the quality of user's experience of a plurality of applications according to the unit of elapsed time.

Figure 9:
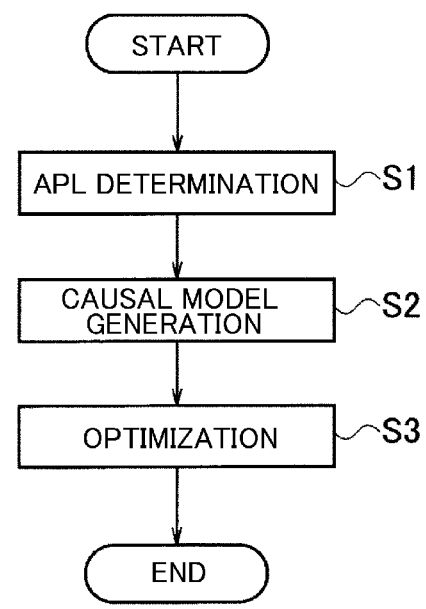
FIG. 9 is a flowchart illustrating a processing procedure of a service quality control method performed by the service quality control device illustrated in FIG. 1.

FIG. 9 is a flowchart illustrating a processing procedure of the service quality control method performed by the service quality control device 100.

As illustrated in FIG. 9, the service quality control method is a service quality control method performed by the service quality control device, including: an APL determination step S1 of acquiring a port number, a traffic volume, network performance including throughput, and network information including quality of user's experience from a network device constituting the network 1 and determining an application to be used by a user by comparing the acquired network information with the APL profile 20 that records the profile of an application; a causal model generation step S2 of acquiring network setting information including bandwidth throttling values from the network device, generating a causal model that associates network setting information with network performance for each application, and generating a causal model that associates network performance with quality of user's experience for each application; and an optimization step S3 of finding a network setting that maximizes the network performance and the quality of user's experience of a plurality of applications on the basis of the causal model. According to this configuration, it is possible to find a network setting that optimally controls the entire network 1. Therefore, for example, it is possible to deal with user's complaints appropriately.

Second Embodiment

Figure 10:
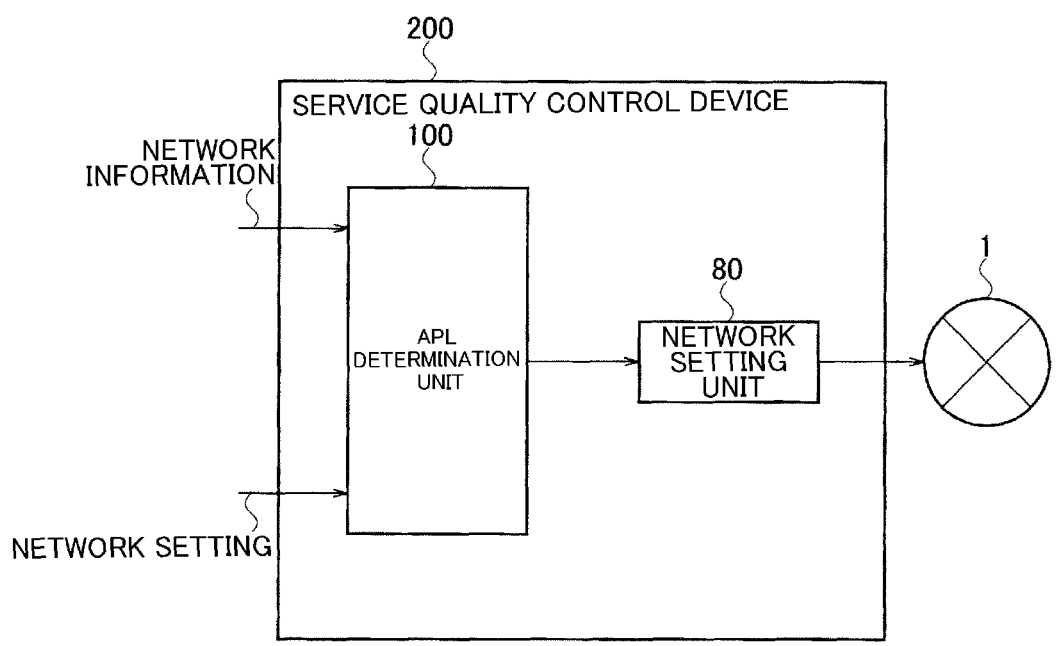
FIG. 10 is a diagram illustrating a functional configuration example of a service quality control device according to a second embodiment of the present invention.

FIG. 10 is a diagram illustrating a functional configuration example of a service quality control device according to a second embodiment of the present invention. A service quality control device 200 illustrated in FIG. 10 differs from the service quality control device 100 (FIG. 1) in that it includes a network setting unit 80.

The network setting unit 80 sets the network setting found by the optimization unit 50 of the service quality control device 100 in the network device constituting the network 1. The network setting found by the optimization unit 50 is set in the network device using, for example, NETCONF (Network Configuration Protocol).

As a result, the network device is set to the network setting that maximizes the network performance and quality of user's experience of a plurality of applications. Therefore, it is possible to optimally control the entire network 1.

As described above, according to the service quality control device 100, it is possible to find a network setting that optimally controls the entire network 1. Further, according to the service quality control device 200, the entire network 1 can be optimally controlled.

Figure 11:
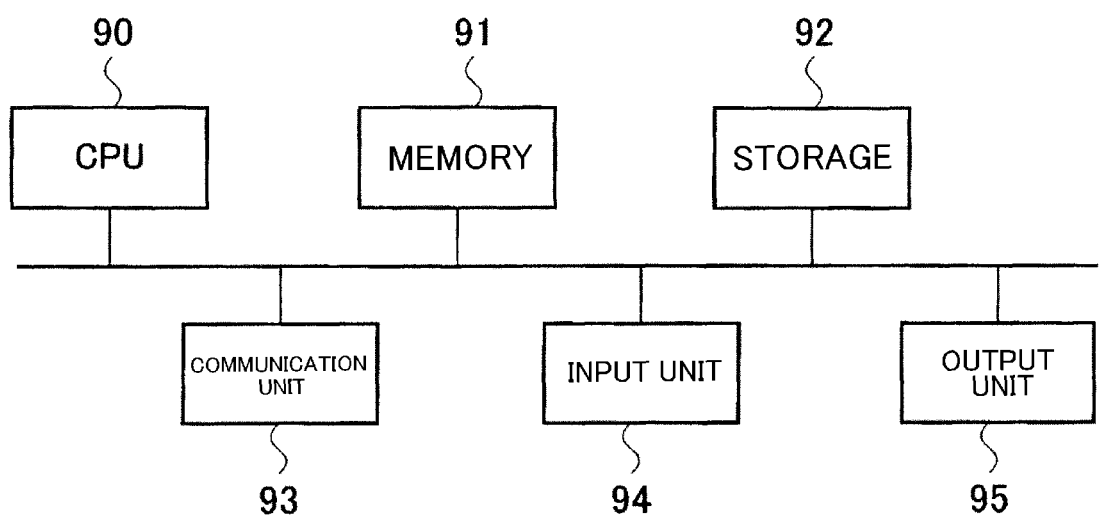
FIG. 11 is a block diagram illustrating a configuration example of a general-purpose computer system.

The service quality control devices 100 and 200 can be realized by a general-purpose computer system illustrated in FIG. 11. For example, the functions of the service quality control devices 100 and 200 are realized when, in a general-purpose computer system including, for example, a CPU 90, a memory 91, a storage 92, a communication unit 93, an input unit 94, and an output unit 95, the CPU 90 executes a predetermined program loaded on the memory 91. The predetermined program may be recorded on a computer-readable recording medium such as HDD, SSD, USB memory, CD-ROM, DVD-ROM, or MO, or may be distributed via a network.

The present invention is not limited to the above embodiments, and can be modified within the scope of the gist thereof. For example, the user model 60 may be omitted. In addition, the causal model may be generated using any regression method such as random forest regression, Ridge/Lasso regression, and deep learning.

As described above, the present invention naturally includes various embodiments not described herein. Therefore, the technical scope of the present invention is defined only by the matters specifying the invention according to claims reasonable from the above description.

REFERENCE SIGNS LIST

10 APL determination unit
20 APL profile
30 Causal model generation unit
40 Causal model recording unit
50 Optimization unit
60 User model
70 Control unit
80 Network setting unit
100, 200 Service quality control device

The invention claimed is:

1. A service quality control device connected to a network, comprising:
    a non-transitory computer-readable recording medium storing an application (APL) profile that records a profile of an application;
    an APL determination unit, comprising one or more processors, configured to acquire a port number, a traffic volume, network performance including throughput, and network information including quality of user's experience from a network device constituting the network and determine the application to be used by a user by comparing the acquired network information with the APL profile;
    a causal model generation unit, comprising one or more processors, configured to acquire network setting information including a bandwidth throttling value from the network device, generate a first causal model that associates network setting information with network performance for the application, and generate a second causal model that associates network performance with quality of user's experience for the application; and
    an optimization unit, comprising the one or more processors, configured to find a network setting that maximizes the network performance and the quality of user's experience of a plurality of applications based on the first and second causal models.

2. The service quality control device according to claim 1, further comprising a network setting unit, comprising the one or more processors, configured to set the network setting found by the optimization unit in the network device.

3. A service quality control method performed by a service quality control device, comprising:
    acquiring a port number, a traffic volume, network performance including throughput, and network information including quality of user's experience from a network device constituting a network and determining an application to be used by a user by comparing the acquired network information and an APL profile that records the APL profile of the application;

acquiring network setting information including a bandwidth throttling value from the network device, generating a first causal model that associates network setting information with network performance for the application, and generating a second causal model that associates network performance with quality of user's experience for the application; and finding a network setting that maximizes the network performance and the quality of user's experience of a plurality of applications based on the first and second causal models.

4. The service quality control method according to claim 3, further comprising: setting the network setting in the network device.

5. A non-transitory computer-readable recording medium storing one or more instructions that are executable for causing a computer to function as the service quality control device according to claim 1.

* * * * *